United States Patent [19]
Narabe et al.

[11] Patent Number: 5,904,945
[45] Date of Patent: *May 18, 1999

[54] EGG YOLK PHOSPHOLIPID COMPOSITION

[75] Inventors: Hitoshi Narabe, Shinjuku-Ku; Kiyoko Tanabe, Hachioji; Yasuhiko Shigematsu, Kunitachi; Toshihide Sato, Fuchu, all of Japan

[73] Assignee: Kewpie Kabushiki Kaisha, Tokyo-To, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,257

[22] Filed: Aug. 29, 1996

[30] Foreign Application Priority Data

Aug. 29, 1995 [JP] Japan ..................................... 7-220784
Jul. 25, 1996 [JP] Japan ..................................... 8-196602

[51] Int. Cl.$^6$ ....................................................... A23B 5/16
[52] U.S. Cl. ......................... 426/330.1; 426/605; 426/47; 435/267; 554/83; 554/8; 554/20
[58] Field of Search ..................................... 426/654, 604, 426/605, 330.1, 47; 554/3, 20, 83; 435/267, 271

[56] References Cited

U.S. PATENT DOCUMENTS

| | | | |
|---|---|---|---|
| 1,024,056 | 4/1912 | Belhonmet | 426/330.1 |
| 2,744,017 | 5/1956 | Baldwin . | |
| 3,014,805 | 12/1961 | Mitz | 426/47 |
| 3,060,038 | 10/1962 | Mancusco | 426/47 |
| 3,222,194 | 12/1965 | Gorman | 426/47 |
| 3,232,769 | 2/1966 | Miller | 426/330.1 |
| 4,714,571 | 12/1987 | Tremblay | 554/83 |
| 4,814,111 | 3/1989 | Kearns | 554/83 |
| 4,847,015 | 7/1989 | Shigematsu et al. | 554/83 |
| 4,857,236 | 8/1989 | Günther | 554/83 |
| 5,079,028 | 1/1992 | Wieske | 426/604 |
| 5,084,215 | 1/1992 | Kearns | 554/83 |
| 5,466,842 | 11/1995 | Heidlas et al. | 554/83 |
| 5,597,602 | 1/1997 | Peter | 554/83 |

FOREIGN PATENT DOCUMENTS

| | | | |
|---|---|---|---|
| 60-55095 | 3/1985 | Japan | 426/330.1 |
| 2002421 | 11/1993 | U.S.S.R. | 426/330.1 |
| 1525929 | 11/1974 | United Kingdom . | |

OTHER PUBLICATIONS

Stadelman & Cotterill 1977 Egg Science & Technology 2nd. Edition AVI Publishing Co. Inc. Westport CT p. 69–73, 79–80.

*Primary Examiner*—Carolyn Paden
*Attorney, Agent, or Firm*—Oblon, Spivak, McClelland, Maier & Neustadt, P.C.

[57] ABSTRACT

Disclosed is an egg yolk phospholipid composition comprising 80% or less of the composition of phospholipids and 0.10% by weight or less of glucose on the basis of the phospholipids. Such an egg yolk phospholipid composition scarcely undergoes browning during the preservation thereof although the phospholipids purity of the composition is not so high, that is, the phospholipids content of the composition is only 80% or less.

8 Claims, 1 Drawing Sheet

EGG YOLK PHOSPHOLIPID COMPOSITION

TECHNICAL FIELD OF THE INVENTION

The present invention relates to an egg yolk phospholipid composition comprising as main component egg yolk phospholipids.

BACKGROUND OF THE INVENTION

Heretofore, there has been well known such an egg yolk phospholipid composition that is obtained by breaking an egg, separating egg yolk from the broken egg, drying the egg yolk to obtain dried egg yolk, allowing, for instance, an alcohol to act on the dried egg yolk to extract alcohol-soluble components therefrom, and then removing the alcohol from the extract. The egg yolk phospholipid composition obtained in this manner generally contains at least 20% of egg yolk phospholipids. A purification process required for producing a crude product whose phospholipids content is 80% or less is not so complicated and difficult as that required for producing a product whose phospholipids content is higher than 80%, so that such a crude product can be obtained at relatively low cost. Therefore, the crude product has been made into a capsule preparation by being placed in capsules made from, for example, gelatin, and hitherto widely used as, for instance, a complementary food for health, an enriched food for the brain, or the like.

However, the above capsule preparation has had such a problem that, when it is placed in a bottle and the bottle is capped air-tightly and stored, for instance, at a normal temperature, the color of the capsule preparation changes from bright yellow to dark brown within approximately 3 months, and its appearance is thus drastically impaired. It seems that this change in color occurs because the egg yolk phospholipid composition contained in the capsules undergoes such a reaction as oxidation or polymerization. It is noted that the above problem has rarely been found in a capsule preparation obtained by using a phospholipid composition whose phospholipids content is higher than 80%, that is, a phospholipid composition which has been purified so that it will have, as phospholipids, a purity of higher than 80%.

A primary object of the present invention is therefore to provide a novel egg yolk phospholipid composition whose color scarcely changes to brown during the preservation thereof although the phospholipids purity of the composition is not so high, that is, the phospholipids content of the composition is only 80% or less.

SUMMARY OF THE INVENTION

We made extensive studies in order to attain the above object, and, as a result, found that the degree of browning of an egg yolk phospholipid composition having, as phospholipids, a purity of 80% or less, caused during the preservation thereof depended on the percentage of glucose to phospholipids contained in the composition. The present invention has been accomplished on the basis of this finding.

The present invention is therefore to provide an egg yolk phospholipid composition characterized in that the phospholipids content of the composition is 80% or less and that the percentage of glucose to phospholipids contained in the composition is 0.10% by weight or less.

Thus, the present invention is to provide an egg yolk phospholipid composition whose color scarcely changes to brown during the preservation thereof although the phospholipids content of the composition is only 80% or less.

Further, the present invention is to provide an egg yolk phospholipid composition having a glucose content controlled as above in which the percentage of cholesterol to phospholipids has also been adjusted to 5% by weight or less. The latter egg yolk phospholipid composition can provide products which are more suitable as complementary foods for health. Furthermore, the present invention is to provide an egg yolk phospholipid composition which is suitable for producing enriched foods for the brain supplemented with vitamin $B_{12}$.

It is noted that all percentages set forth herein are "% by weight" unless otherwise indicated.

DETAILED DESCRIPTION OF THE INVENTION

Figure 1:
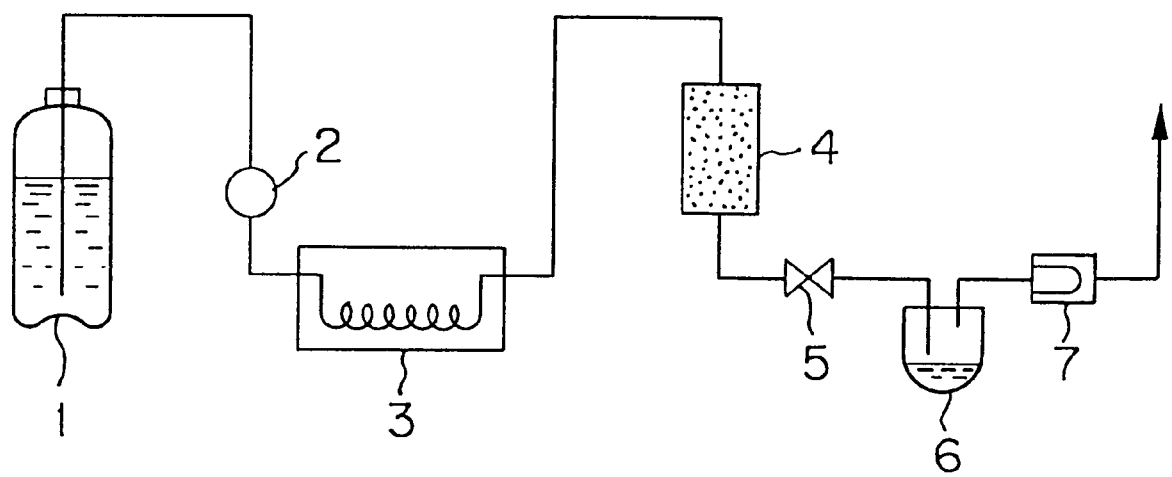
FIG. 1 is an illustration showing one example of extractors useful for carrying out the extraction process in the present invention, using supercritical carbon dioxide.

The present invention is directed to an egg yolk phospholipid composition containing 80% or less of phospholipids. This is because an egg yolk phospholipid composition whose phospholipids content, that is, phospholipids purity, is higher than 80% is relatively free from browning. The purity of the phospholipid composition of the invention is specifically 20%, 30%, 40%, 50%, 60%, 70% or the like although it depends on the process for producing and/or purifying the egg yolk phospholipid composition. The egg yolk phospholipid composition of the present invention comprises as main component egg yolk phospholipids, and the phospholipids content of the composition is preferably at least 20%. Further, the "phospholipids" in the present invention comprise as the components thereof phosphatidylcholine, phosphatidylethanolamine, lyso-compounds thereof (lysophosphatidylcholine and lysophosphatidylethanolamine), sphingomyelin and the like, which are the main components of egg yolk phospholipids.

As mentioned previously, a conventional egg yolk phospholipid composition is generally produced by breaking an egg, separating egg yolk from the broken egg, drying the egg yolk as it is to obtain dried egg yolk, allowing, for instance, an alcohol (ethyl alcohol having a purity of 99 to 90%, the remaining 1–10% portion being mostly water) to act on the dried egg yolk to extract alcohol-soluble components (mainly neutral lipids (triglyceride), cholesterol and phospholipids) therefrom with the alcohol, and then removing the alcohol, solvent, from the extract. In general, the egg yolk phospholipid composition obtained in this manner has a phospholipids purity of approximately 20 to 60%. It is however possible to increase the phospholipids purity to approximately 80% by subjecting the phospholipid composition to a relatively simple purification process, more specifically, to a treatment, for instance, with acetone, thereby successively removing neutral lipids and cholesterol, which are relatively soluble in acetone, from the composition. Such a conventional crude egg yolk phospholipid composition was examined in terms of the glucose content thereof. As a result, the glucose content was found to be approximately 0.20 to 0.70% of the weight of the phospholipids contained in the composition. We further made studies, and found that the degree of browning of such a crude egg yolk phospholipid composition, caused during the preservation thereof depended upon the amount of glucose contained in the composition. Moreover, we further found that, when the percentage of glucose to phospholipids contained in such a composition was 0.10% by weight or less, the composition scarcely underwent browning during the preservation thereof.

Therefore, the egg yolk phospholipid composition of the present invention has a percentage of 0.10% by weight or less of glucose to phospholipids. Practically, it is difficult to produce, on an industrial scale, an egg yolk phospholipid composition whose glucose content is 0.01% or less of the weight of phospholipids contained in the composition. For this reason, the egg yolk phospholipid composition of the present invention is preferably such that the percentage of glucose to phospholipids contained in the composition is higher than 0.01% by weight but not more than 0.10% by weight. Specifically, the percentage of glucose to phospholipids contained in the composition is 0.02% by weight, 0.03% by weight, 0.05% by weight, 0.07% by weight or the like.

Such an egg yolk phospholipid composition of the present invention generally comprises cholesterol, triglyceride, etc. which are derived from the egg sources. Therefore, when an egg yolk phospholipid composition more useful for producing complementary foods for health is intended, the egg yolk phospholipid composition having a low cholesterol content, preferably 5% by weight or less, more preferably 1% by weight or less of cholesterol to phospholipids is especially preferred. Further, the egg yolk phospholipid composition of the present invention can further comprise those starting materials or components which are usually used for obtaining final products. Examples of such starting materials or components include excipients (e.g., dextrin, lactose, glycerin, salad oil, etc.) with which the egg yolk phospholipid composition can be readily placed in capsules made from gelatin or the like, vitamin E which is effective for enhancing the preservation stability, and vitamin $B_{12}$. The percentages of these starting materials or components incorporated on the basis of final products are not particularly different from the conventional products. It is noted that the composition supplemented with vitamin $B_{12}$ is suitable for producing enriched foods for the brain for individuals who have aged or aging because such enriched foods will show the effects of improving the function of the brain and/or preventing the hypofunction of the brain, that is, the effects of preventing hypomnesia, curing or preventing dementia, and the like.

Typical methods for producing such an egg yolk phospholipid composition of the present invention (the following methods A and B) will be explained hereinafter.

Method A:

(1) Treatment for Removing Sugar from Egg Yolk

Egg yolk separated from the white of broken eggs is firstly subjected to a treatment for removing sugar therefrom, that is, removing glucose contained therein. The enzyme treatment method, the yeast treatment method, or the like can be mentioned as a method for carrying out the treatment for removing sugar.

Enzyme Treatment Method:

In general, glucose oxidase (e.g., "Glucose Oxidase EC 1. 1. 3. 4 [originated from molds] manufactured by Novo Nordisk AS) is added to the egg yolk in an amount of 100 to 2,000 units per 1 kg of the egg yolk, and the mixture is preserved at a temperature of 10 to 60° C. for 1 to 10 hours (to allow the glucose oxidase to act on the egg yolk).

When glucose oxidase is used, it is useful to add small amounts of catalase and hydrogen peroxide so as to promote the action of the enzyme. Many of commercially available glucose oxidases thus contain catalase.

(1 micromol of hydrogen peroxide is produced by 1 unit of glucose oxidase at a temperature of 25° C. and a pH of 5.1.)

Yeast Treatment Method:

In general, 0.2 to 0.5% of baker's yeast is added to the egg yolk, and allowed to act on the egg yolk at a temperature of 20 to 25° C. for 2 to 4 hours.

In either method is used a tes-tape for detecting glucose (whose color is yellow and changes to green when the tape reacts with glucose), which will be described later, and the point at which the color of the tape does not change from yellow to green any more can be considered to be (a sign of) the end point of the reaction.

(2) Drying of Sugar-Removed Egg Yolk

The sugar-removed egg yolk is dried, for instance, by means of spray drying or freeze-drying. Although the drying is not essential, the subsequent solvent extraction can be readily done when the egg yolk has been dried in advance.

(3) Solvent Extraction from Dried Egg Yolk

The dried egg yolk obtained by the above process is subjected to extraction with an alcohol (concentration of ethyl alcohol: approx. 90 to 99%, concentration of water: approx. 10 to 1%), and the alcohol is removed from the extract. By this, a phospholipid composition having a phospholipids purity of approximately 20 to 60% can be obtained. If necessary, this composition is then subjected to acetone treatment, and the acetone (in which cholesterol and triglyceride are mainly dissolved) is removed, thereby decreasing the amounts of cholesterol and triglyceride contained in the composition. A phospholipid composition having a further increased phospholipids purity can thus be obtained.

The percentage of glucose to phospholipids contained in the product obtained in such a manner is, in general, from 0.02 to 0.07% by weight.

In the case where additives (serving as an excipient and the like) are incorporated into the above-obtained product at the time when the product is made into a capsule preparation or the like by being placed in gelatin capsules or the like, the phospholipid composition is to have a slightly decreased purity due to the additives incorporated.

The phospholipids content of the egg yolk phospholipid composition obtained by the above method A is 80% or less, and the percentage of glucose to phospholipids contained in the composition is 0.10% by weight or less. Although the phospholipid composition scarcely undergoes browning during the preservation thereof, the percentage of cholesterol to phospholipids contained in this composition is higher than 5% by weight, generally approximately 10% by weight. Therefore, in order to obtain an egg yolk phospholipid composition in which the percentage of cholesterol to phospholipids is 5% by weight or less and which is suitable for producing complementary foods for health, it is proper to adopt, for example, the following method B.

Method B:

(a) Treatment for Removing Sugar from Egg Yolk and Drying of Sugar-Removed Egg Yolk Sugar-removed dried egg yolk is prepared in accordance with the processes (1) and (2) in the above-described method A.

(b) Treatment Using Supercritical Carbon Dioxide

By bringing supercritical carbon dioxide into contact with the sugar-removed dried egg yolk, cholesterol contained in the dried egg yolk is extracted and removed therefrom. The extraction of cholesterol from the dried egg yolk by using as an extraction solvent supercritical carbon dioxide may be carried out, for instance, in accordance with the method described in Japanese Patent Publication No. 37838/1992, the patentee being the applicant of the present application.

By referring to FIG. 1, a specific example of this treatment will be explained hereinafter.

The apparatus shown in FIG. 1 is an extractor for use with supercritical carbon dioxide. Liquid carbon dioxide contained in a liquid carbon dioxide cylinder 1 is introduced, by operating a plunger pump 2, into a heating device 3 to gasify the carbon dioxide. The gasified carbon dioxide is then introduced into an extraction tank 4. At this time, a valve 5 is remained closed so as to change the carbon dioxide into the supercritical state. The dried egg yolk has been placed in the extraction tank 4 in advance. The supercritical carbon dioxide formed is brought into contact with the dried egg yolk in this extraction tank. It is noted that supercritical carbon dioxide with desired conditions can be formed by properly controlling the temperature of the heating device 3 and the operation pressure of the plunger pump 2. When the valve 5 is half opened at the time when the extraction of cholesterol is started in the extraction tank 4, the cholesterol-containing carbon dioxide in the critical state runs out from the extraction tank 4, turning to carbon dioxide gas of atmospheric pressure, which is then introduced into a separation tank 6, in which the extracted oil is separated. The carbon dioxide gas is allowed to further pass through a cylindrical filter 7, and then recycled to a liquefaction process (not shown in the figure). The carbon dioxide gas is thus recovered as liquid carbon dioxide. After the above extraction process is continuously carried out for 2 to 15 hours, the operation of the plunger pump 2 is stopped, and the valve 5 is fully opened. The inside pressure of the extraction tank 4 thus becomes atmospheric pressure, and the supercritical carbon dioxide contained in the egg yolk in this tank is driven out as carbon dioxide gas and runs out from the extraction tank 4. On the other hand, the egg yolk from which cholesterol has been removed by extraction is recovered in dry state from the extraction tank 4 equipped with filters at the top and bottom thereof, and then introduced to the subsequent alcohol extraction process.

By the above-described extraction process using supercritical carbon dioxide, not only most of cholesterol contained in the dried egg yolk can be removed therefrom, but also neutral lipids such as triglyceride can also be removed by extraction. It is noted that the degree of removal of these materials tends to become higher when the extraction conditions are made intenser, that is, the temperature and pressure are made higher and the extraction time is made longer. For instance, cholesterol contained in the dried egg yolk can be almost completely removed and most of neutral lipids can be removed when the extraction is carried out at a temperature of 40 to 45° C. for 10 to 15 hours under a pressure of 180 to 300 atm.

(c) Solvent Extraction from Dried Egg Yolk

The dried egg yolk is subjected to extraction with an alcohol (concentration of ethyl alcohol: 90 to 100%, concentration of water 10 to 0%), and the alcohol is removed from the extract. By this, an egg yolk phospholipid composition having a phospholipids purity of approximately 50% or higher (generally from 50 to 80%) can be obtained. In this case, the glucose content of the composition is, in general, from 0.02 to 0.07% of the weight of phospholipids contained in the composition.

In the course of the above-described solvent extraction, an egg yolk phospholipid composition having a phospholipids content of higher than 80% can also be obtained. However, such an egg yolk phospholipid composition is poor in fluidity, so that it cannot be easily made into a capsule preparation or the like. For this reason, the composition is diluted with edible oil and fat to lower the phospholipids content thereof to 80% or less, and then made into a final product. Vegetable oil such as soybean oil, corn oil, rapeseed oil, cotton oil or palm oil, animal oil and fat such as tallow, lard, fish oil or whale oil, or edible ester-exchanged oil and fat can be used as the edible oil and fat.

The present invention will now be explained in greater detail with reference to the following Examples and Test Example.

EXAMPLE 1

10 kg of egg yolk obtained by breaking eggs and removing the white therefrom was heated to 45° C. To this egg yolk were added commercially available glucose oxidase ("Glucose Oxidase SP 358" containing a small amount of catalase, manufactured by Novo Nordisk AS) in an amount of 5 ml (corresponding to approximately 1,000 units of the glucose oxidase per 1 kg of the egg yolk), and 10 ml of an aqueous 30% hydrogen peroxide, and the mixture was stirred. The residual sugar content was determined by "Tes-Tape A" (a test paper for checking urine sugar, manufactured by Shionogi & Co., Ltd.). The treatment was continued for approximately 2 hours until the color of the tes-tape did not change to green any more. The sugar-removed egg yolk was cooled, and then spray-dried to remove water therefrom, thereby obtaining 4.5 kg of sugar-removed dried egg yolk. 9 liters of a 95% alcohol was added to approximately 1 kg of this sugar-removed dried egg yolk, and the mixture was stirred at 30° C. for 30 minutes. The mixture was then filtered to obtain an extract. The residue obtained by this filtration was washed with 1 liter of a 95% alcohol, and this wash liquid and the above filtrate (extract) were combined. From the resulting mixture, the solvent (alcohol) was removed under reduced pressure to obtain a phospholipid composition.

The egg yolk phospholipid composition thus obtained was found to have a phospholipids content of approximately 60%. Moreover, the percentage of glucose to phospholipids contained in this composition was approximately 0.03% by weight.

EXAMPLE 2

10 kg of egg yolk obtained by breaking eggs and removing the white therefrom was heated to 40° C. To this egg yolk were added commercially available glucose oxidase ("Glucose Oxidase SP 358" containing a small amount of catalase, manufactured by Novo Nordisk AS) in an amount of 5 ml (corresponding to approximately 1,000 units of the glucose oxidase per 1 kg of the egg yolk), and 10 ml of an aqueous 30% hydrogen peroxide, and the mixture was stirred. The residual sugar content was determined by "Tes-Tape A" (a test paper for checking urine sugar, manufactured by Shionogi & Co., Ltd.). The treatment was continued for approximately 3 hours until the color of the tes-tape did not change to green any more. The sugar-removed egg yolk was cooled, and then spray-dried to remove water therefrom, thereby obtaining 4.5 kg of sugar-removed dried egg yolk. 9 liters of a 98% alcohol was added to approximately 1 kg of this sugar-removed dried egg yolk, and the mixture was stirred at 30° C. for 30 minutes. The mixture was then filtered to obtain an extract. The residue obtained by this filtration was washed with 1 liter of a 98% alcohol, and this wash liquid and the above filtrate (extract) were combined. From the resulting mixture, the solvent (alcohol) was removed under reduced pressure to obtain a phospholipid composition.

The egg yolk phospholipid composition thus obtained was found to have a phospholipids content of approximately 35%. Moreover, the percentage of glucose to phospholipids contained in this composition was approximately 0.04% by weight.

EXAMPLE 3

11 kg of egg yolk obtained by breaking eggs and removing the white therefrom was heated to 45° C. To this egg yolk were added commercially available glucose oxidase ("Glucose Oxidase SP 358" containing a small amount of catalase, manufactured by Novo Nordisk AS) in an amount of 5 ml (corresponding to approximately 1,000 units of the glucose oxidase per 1 kg of the egg yolk), and 10 ml of an aqueous 30% hydrogen peroxide, and the mixture was stirred. The residual sugar content was determined by "Tes-Tape A" (a test paper for checking urine sugar, manufactured by Shionogi & Co., Ltd.) The treatment was continued for approximately 10 hours until the color of the tes-tape did not change to green any more. The sugar-removed egg yolk was cooled, and then spray-dried to remove water therefrom, thereby obtaining 5.0 kg of sugar-removed dried egg yolk. Supercritical carbon dioxide of 40° C. and 200 atm was brought into contact with 5.0 kg of the sugar-removed dried egg yolk for a period of 9 hours by using the apparatus shown in FIG. 1. After the extraction was completed, the temperature and pressure were allowed to be normal to separate the carbon dioxide from the sugar-removed dried egg yolk. 3.3 kg of dried egg yolk containing only small amounts of cholesterol and neutral lipids was thus obtained. 9 liters of a 95% alcohol was added to approximately 1 kg of this dried egg yolk, and the mixture was stirred at 30° C. for 30 minutes. The mixture was then filtered to obtain an extract. The residue obtained by this filtration was washed with 1 liter of a 95% alcohol, and this wash liquid and the above filtrate (extract) were combined. From the resulting mixture, the solvent (alcohol) was removed under reduced pressure to obtain 0.4 kg of an egg yolk phospholipid composition.

The egg yolk phospholipid composition thus obtained was found to have a phospholipids content of approximately 65%. Moreover, the percentage of glucose to phospholipids contained in this composition was approximately 0.02% by weight, and that of cholesterol to phospholipids contained in the composition was approximately 1.0% by weight.

EXAMPLE 4

By using a capsule molder, a mixture having the following formulation, which had been heated and homogenized in advance, was encapsulated in gelatin capsules (the composition of the materials used for making the capsules being the same as is shown in Test Example which will be described later; the thickness of the capsule: approx. 0.8 mm). A capsule preparation with approximately 0.5 g of the mixture encapsulated in one capsule was thus obtained.

| Formulation of Mixture to be Encapsulated | Percentage (%) |
| --- | --- |
| Egg yolk phospholipid composition prepared in Example 1 | 97.8 |
| Vitamin E | 2.0 |
| Vitamin $B_{12}$ | 0.2 |
| Total | 100.0 |

TEST EXAMPLE 8 types of egg yolk phospholipid compositions (Samples No. 1 to No. 8) as shown in the table below, different in the percentage of glucose to phospholipids contained therein were prepared in the same manner as in Example 1, provided that the time for the treatment carried out after the addition of the glucose oxidase to the egg yolk was varied.

The compositions prepared were respectively encapsulated in gelatin capsules (the composition of the materials used for making the gelatin capsules: 66.0% of gelatin and 34.0% of glycerin; the thickness of the gelatin capsule: 0.8 mm; the amount of the phospholipid composition encapsulated: approx. 0.5 g/capsule). The capsules containing each composition were placed in a glass bottle, and the bottle was capped air-tightly with a little head space. The bottles were stored in an incubator at 70° C. for 4 hours so that the compositions contained in the capsules would undergo changes acceleratedly. Thereafter, the phospholipid compositions were respectively collected from the capsules, and a 5% solution of each phospholipid composition in chloroform was prepared. The absorbance at 350 nm of the solution of each phospholipid composition was measured by a spectrophotometer. The larger is the measured value, the greater is the change in color.

The results of the measurement are shown in Table 1 below.

TABLE 1

| Sample No. | 1 | 2 | 3 | 4 | 5 | 6 | 7 | 8 |
| --- | --- | --- | --- | --- | --- | --- | --- | --- |
| Percentage of glucose to phospholipids contained in composition (wt. %) | 0.02 | 0.04 | 0.06 | 0.08 | 0.10 | 0.12 | 0.14 | 0.16 |
| Absorbance | 0.69 | 0.69 | 0.71 | 0.72 | 0.72 | 1.50 | 1.83 | 2.20 |

Note 1:
Storage in an incubator at 70° C. for 4 hours corresponds to storage at a normal temperature (15° C.) for approximately 3 months.
Note 2:
The absorbance of Sample No. 1 before stored at 70° C. for 4 hours was 0.50.

On the other hand, the results of observation by the naked eye of the encapsulated egg yolk phospholipid compositions were such that Samples No. 1 to No. 5 were found to be bright yellow and that Samples No. 6 to No. 8 were found to be brown to dark brown. When these results are compared with the absorbances shown in Table 1, it can be understood that it is preferable to control the percentage of glucose to phospholipids contained in a composition to 0.10% by weight or less in order to prevent the browning of the composition.

An egg yolk phospholipid composition (the percentage of glucose to phospholipids contained in the composition: approx. 0.2% by weight) was prepared in the same manner as in Example 1, provided that the egg yolk was not subjected to the enzyme treatment for removing sugar. The absorbance of this composition was 2.23.

In the present invention, in particular in Examples and Test Example the phospholipids content and the percentage of glucose to phospholipids contained in a composition were determined by the following methods:

(a) Phospholipids Content (%)

Lipid components were analyzed by the TLC-FID method, and the phospholipids content was obtained as the total content of phospholipids (the main components thereof, that is, phosphatidylcholine, phosphatidylethanolamine, lyso-compounds thereof and sphingomyelin).

(b) Glucose Content (%)

The glucose content was determined in the following manner by using a test paper for checking urine sugar ("Tes-Tape A" manufactured by Shionogi & Co., Ltd.):

(1) A phospholipid composition is dispersed in distilled water to obtain a 50% dispersion. This dispersion is applied to the "Tes-Tape A", and an excess of the dispersion is wiped out. The "Tes-Tape A" develops green color, so that the deepness of the color (green color) is read.

(2) This deepness is compared with the deepness of various green colors developed by the "Tes-Tape A" when standard glucose solutions (0 to 100 mg/dl) are applied thereto, whereby the glucose content (%) of a test sample is obtained.

(c) Percentage of Glucose to Phospholipids Contained in Composition (% by weight)

The Percentage was calculated by the following equation, using the phospholipids content (%) obtained in the above (a) and the glucose content (%) obtained in the above (b):

$$\frac{\text{Glucose Content (\%)}}{\text{Phospholipids Content (\%)}} \times 100$$

(d) Cholesterol Content (%)

Lipid components were analyzed by the TLC-FID method to obtain the cholesterol content.

(e) Percentage of Cholesterol to Phospholipids Contained in Composition (% by weight)

The proportion was calculated by the following equation, using the phospholipids content (%) obtained in the above (a) and the cholesterol content (%) obtained in the above (d):

$$\frac{\text{Cholesterol Content (\%)}}{\text{Phospholipids Content (\%)}} \times 100$$

We claim:

1. An egg yolk phospholipid composition comprising 20% to 80% by weight of phospholipids based on the weight of the composition, and 0.01% to 0.10% by weight of glucose based on the phospholipids, said egg yolk phospholipid composition is obtained by removing sugar from egg yolk, drying the sugar-removed egg yolk to obtain dried egg yolk, bringing supercritical carbon dioxide into contact with the dried egg yolk to obtain dried egg yolk whose cholesterol content is reduced, subjecting this dried egg yolk to extraction with an alcohol, and removing the alcohol from the extract.

2. The egg yolk phospholipid composition according to claim 1, which maintains bright yellow color even when it is stored at a temperature of 70° C. for 4 hours.

3. The egg yolk phospholipid composition according to claim 1, wherein the percentage of cholesterol to phospholipids contained in the composition is 5% or less.

4. The egg yolk phospholipid composition according to claim 1, which is supplemented with vitamin $B_{12}$.

5. A method of preparing an egg yolk phospholipid composition comprising 20 to 80% by weight of phospholipids based on the total weight of the composition, and 0.01% to 0.1% by weight of glucose based on the phospholipids, said method comprising removing sugar from egg yolk, drying the sugar-removed egg yolk to obtain dried egg yolk, subjecting the dried egg yolk to extraction with an alcohol, and removing the alcohol from the extract.

6. The method of claim 5, wherein the percentage of cholesterol contained in the composition is 5% by weight or less based on the phospholipid content.

7. A method of preparing an egg yolk phospholipid composition comprising 20% to 80% by weight of phospholipids based on the total weight of the composition, and 0.01% to 0.1% by weight of glucose based on the phospholipids, said method comprising removing sugar from egg yolk, drying the sugar-removed egg yolk to obtain dried egg yolk, bringing super critical carbon dioxide into contact with the dried egg yolk to obtain dried egg yolk having lower cholesterol content, subjecting this dried egg yolk to extraction with an alcohol, and removing the alcohol from the extract.

8. The method of claim 7, wherein the percentage of cholesterol contained in the composition is 5% by weight or less based on the phospholipid content.

* * * * *